UNITED STATES PATENT OFFICE.

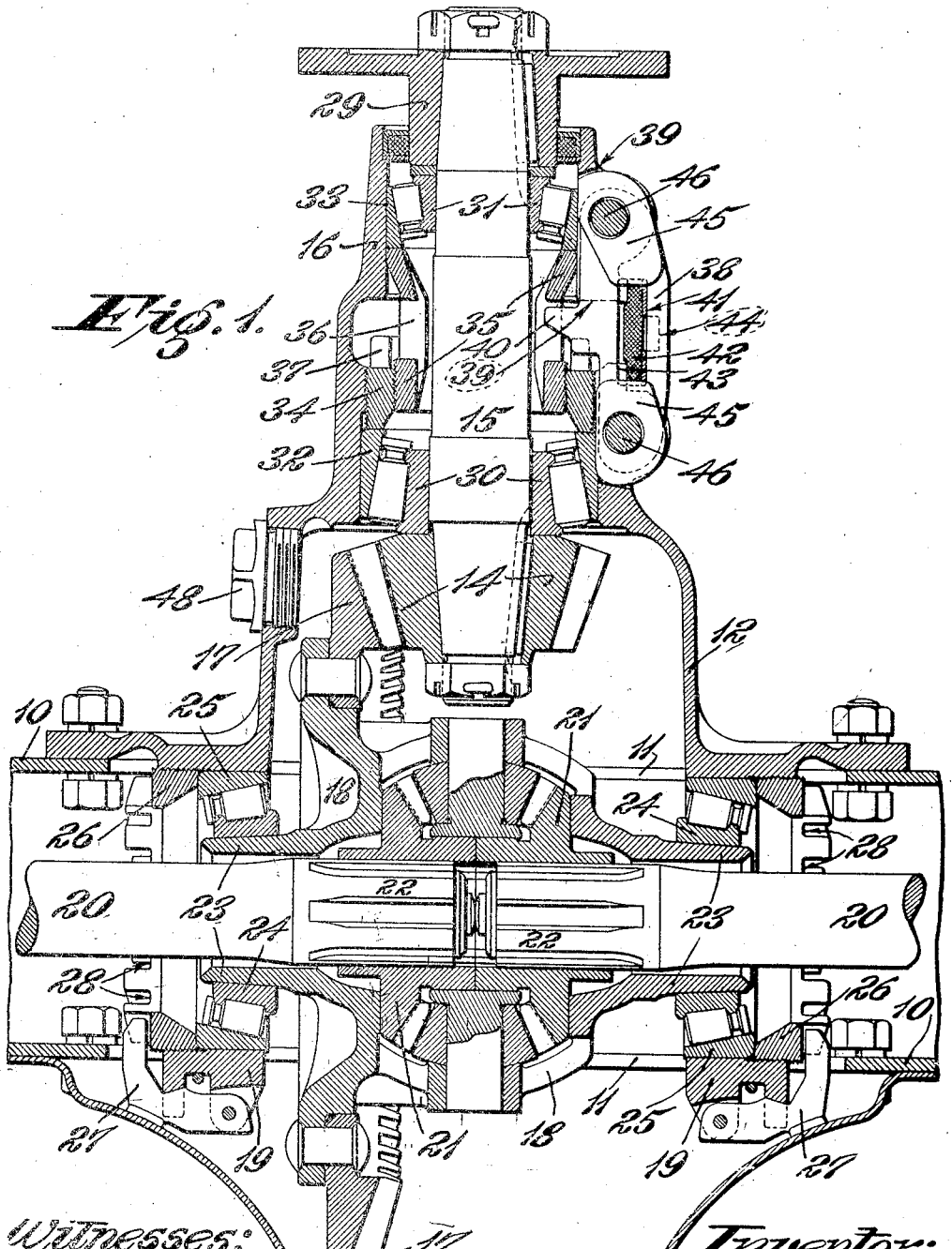

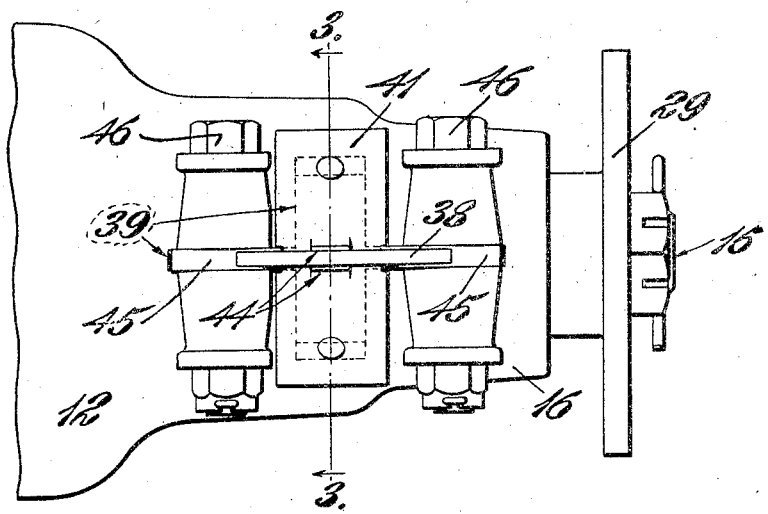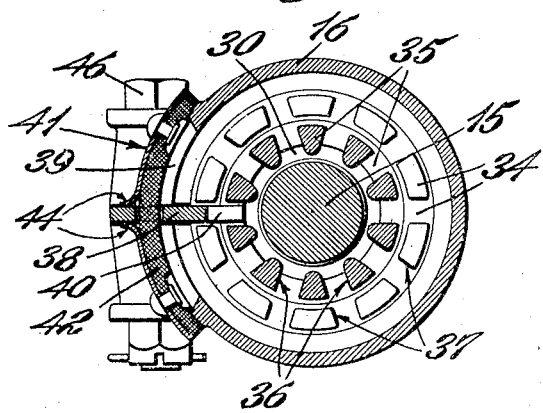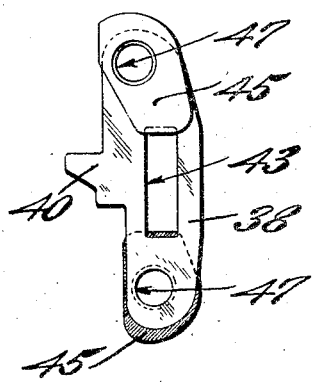

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO.

BEARING.

1,231,320.  Specification of Letters Patent.  Patented June 26, 1917.

Application filed December 9, 1915. Serial No. 65,889.

*To all whom it may concern:*

Be it known that I, HERBERT W. ALDEN, a citizen of the United States, and a resident of the city of Detroit, county of Wayne, and State of Michigan, have invented a new and useful Improvement in Bearings, of which the following is a specification.

This invention relates particularly to adjustable antifriction bearings of the tapered roller type, but it is applicable to ball bearings and to conical bearings without rollers.

The objects of the invention are to arrange for adjusting the back-lash between the bearing members and for adjusting the position of the bearing members relative to their supports in a simple, compact construction of special strength and rigidity. Further objects of the invention are to lock the parts in adjusted position and to protect them from dirt and from outside injury.

The invention consists in a pair of oppositely arranged cone bearings secured on a spindle and coöperating with adjustable bearing sleeves or bushings mounted in an inclosing housing and secured in position by two adjusting rings which are adjustably connected to each other for adjusting movement either simultaneously or separately.

The invention also consists in the locking key for locking both adjusting rings in adjusted position, and in the arrangement of locking key clamp bolts and walls of the inclosing housing, as is hereinafter more fully described.

In order to illustrate the invention, reference is made to the accompanying drawings, which show a preferred form of the invention.

In the drawings, wherein the same reference characters are used to designate like parts in the several views, Figure 1 is a horizontal section through the middle portion of an automobile driving axle embodying the invention, the section being taken on the principal axis of the driving shafts;

Fig. 2 is a side view of the extremity of the nose portion of the differential gear carrier or supporting member, showing the clamping bolts and locking key;

Fig. 3 is a cross-section of the same on the line 3—3 in Fig. 2; and

Fig. 4 is a side view of a composite steel and rubber locking piece or key, showing one of the rubber pads in section.

The invention is applicable to various types of adjustable antifriction bearings, and to bearings for wheels and shafts for various purposes which require provision to be made for endwise or axial adjustment of the wheel or shaft with respect to the supporting member. In the drawings it is shown applied to the bearings for the shaft which carries the bevel driving pinion of an automobile axle driving gearing.

In the construction shown in the drawings, the hollow axle 10 has a transverse hole 11 through its side walls at its middle, to receive the differential gear. A gear carrier, 12 is removably secured to one side wall of the hollow axle 10, and incloses and supports the driving gearing and bearings therefor. The gear carrier projects into the axle through the hole on one side for supporting the differential gear. The gear carrier 12 covers the hole on one side of the axle, and the opposite side of the axle is provided with a cover 13 for closing the hole on that side, whereby the driving gearing is completely inclosed.

The driving gearing includes a bevel driving pinion 14, which is mounted on the inner end of a pinion shaft 15 journaled in bearings in the nose portion 16 of the gear carrier, and a large driven bevel gear 17, which is fixed on the differential gear cage 18 mounted in bearings in the pedestals 19 forming part of the gear carrier and projecting into the hollow axle in axial alinement with the driving shafts 20.

The inner ends of the driving shafts 20 are supported in the hubs of the driven gears 21 of the differential gear, and are slotted lengthwise to form ribs or keys 22 which fit into similar slots in the hubs of the gears to cause the shafts to rotate with the gears. This arrangement permits relative movement of the differential gears, together with the cage 18 in which they are mounted, lengthwise of the axle shafts. The differential gear cage 18 has hubs or hollow spindles 23 projecting from its ends, upon which are mounted the inner or cone bearing members 24 of a pair of oppositely arranged tapered roller bearings. The outer or cup members 25 of the roller bearings for the differential gear cage 18 are adjustably held in the pedestals 19, the adjustment being effected by means of screw rings 26 which screw into the pedestals behind the cups 25 to retain them in proper position. The back-lash in the roller bearings for the differential gear cage 18 can be taken up by adjusting one or both of the screw rings 26. By adjusting both screw rings 26 simultaneously, the differential gear cage 18 can be moved one way or the other in the hollow axle 10; and thereby the relative position of the bevel gear 17 with respect to the bevel driving pinion 14 can be varied to adjust the depth of enmeshment of the teeth of the driving gears. The adjusting rings 26 may be locked in adjusted position by means of the detents 27 which are pivoted on the pedestals 19 and which have projections for engaging in the notches 28 in the back edges of the adjusting rings 26. The detents 27 are held in engagement with the notches 28 by the cover 13 when it is in place over the hole in the axle.

The pinion shaft 15 carries a driving disk 29 at its outer end, and is rotatably and adjustably supported in the nose portion 16 of the gear carrier 12 by means of adjustable tapered roller bearings. The inner members or cones 30, 31 of the bearings for the pinion shaft are oppositely arranged thereon near its ends, the cone 30 abutting against the hub of the bevel driving pinion 14, and the opposite cone 31 abutting against the hub of the driving disk 29. The outer bearing members or cups 32, 33 of the pinion shaft bearings are slidably mounted in the bore of the nose 16 of the gear carrier. The inner cup 32 is held in adjusted position in the nose 16 by means of a screw ring 34 which is screwed into a threaded portion of the bore of the nose against the outer end of the cup.

The outer cup 33 of the pinion shaft bearings is held in adjusted position in the nose 16 of the gear carrier by means of a skeletonized screw ring 35 having one end bearing against the cup 33, and the other end screwed into the adjusting ring 34, the interior of which is threaded to receive it. The skeletonized adjusting ring 35 has a series of longitudinal slots 36 arranged around it between its ends, and the adjusting ring 34 has a series of notches 37 in its outer end which overlap the slots 36. Both adjusting rings are held in adjusted position by means of a locking piece or key 38 which is arranged in a longitudinal slot 39 in the side of the nose portion 16 of the gear carrier. The key 38 has a projection 40 on its inner edge for engaging in the notches 37 in the adjusting ring 34, and which is formed with a tongue for engaging in the slots 36 in the adjusting ring 35.

The middle portion of the slot 39 is widened out to provide room for the insertion of a suitable tool into the nose portion 16 of the gear carrier to adjust the rings 34 and 35. This widened portion of the slot 39 is covered by a curved strip of steel 41 provided with a rubber or felt facing 42 on its inner face to keep dirt out of the nose 16 and to keep the lubricating oil in. The strip 41 is held in a slot 43 in the key, through which it passes, by prongs 44 struck up from the metal on each side of the key near its middle. The ends of the key are incased with soft rubber pads 45 to fill the narrow ends of the slot. These rubber pads are molded in place on the key, and vulcanized to the steel to hold them.

The key 38 is secured in the slot 39 by the clamping bolts 46 which contract the walls of the slotted portion of the nose around the bearing cups and adjusting rings to hold them rigidly. The clamping bolts 46 pass through holes 47 in the ends of the key 38 and in the rubber pads or filling pieces 45, thereby positively retaining the key in locking position.

In order to adjust the bearings for the pinion shaft 15, the clamping bolts, key and cover strip are removed, and suitable tools are inserted through the slot 39 for rotating the adjusting rings 34 and 36 in opposite directions to unscrew one from the other, and thereby the two bearing cups 32 and 33 may be forced apart until all excessive back-lash or lost motion between the bearings is taken up. A suitable tool may then be inserted through the slot 39 for engaging the notches 37 and slots 36 in the two adjusting rings and rotating both adjusting rings simultaneously in one direction or the other to move the bearings and the pinion shaft one way or the other in the nose portion of the gear carrier for adjusting the depth of mesh of the bevel driving pinion 14 and bevel gear 17. An opening closed by a screw plug 48 is provided in the wall of the gear carrier opposite the point of engagement of the bevel driving gears for inspecting the depth of mesh of the bevel gears.

From the foregoing description it is evident that the invention is capable of extensive application, and it is not restricted to the forms and arrangements of the parts as shown and described, nor to automobile driving axles.

I claim the following as my invention:

1. An adjustable bearing for a shaft or spindle arranged in an inclosing housing, said bearing comprising oppositely disposed bearing cones on said shaft and bearing cup members coöperating therewith movably mounted in said housing for adjustment toward and away from said cones, means for adjusting each of said bearing cup members in said housing, said adjusting means being operable selectively and having adjacent portions adapted for identical movement whereby they are adjustable simultaneously, and means for retaining said adjusting means in adjusted position in said housing.

2. An adjustable bearing for a shaft or spindle arranged in an inclosing housing, said bearing comprising oppositely disposed bearing cones on said shaft and bearing cup members coöperating therewith movably mounted in said housing for adjustment toward and away from said cones, screw rings for adjusting each of said bearing cup members in said housing, said screw rings being operable selectively and having coöperating portions whereby they are adjustable simultaneously, and means for retaining said screw rings in adjusted position in said housing.

3. An adjustable bearing for a shaft or spindle arranged in an inclosing housing, said bearing comprising oppositely disposed bearing cones on said shaft and bearing cup members coöperating therewith movably mounted in said housing for adjustment toward and away from said cones, means for adjusting each of said bearing cup members in said housing, said adjusting means being operable selectively and simultaneously, an opening in said housing for access to said adjusting means, a cover for said opening, and means for retaining said adjusting means in adjusted position in said housing, said retaining means also retaining said cover over said opening.

4. An adjustable bearing for a shaft or spindle arranged in an inclosing housing, said bearing comprising oppositely disposed bearing cones fixed on said shaft and bearing cup members coöperating therewith movably mounted in said housing between said cones for adjustment toward and away from said cones, means for forcing said bearing cup members apart to take up lost motion in said bearing, said means having an adjustable connection with said housing for positioning it lengthwise thereof to adjust said bearing and shaft longitudinally.

5. An adjustable bearing for a shaft or spindle arranged in an inclosing housing, said bearing comprising oppositely disposed bearing cones fixed on said shaft and bearing cup members coöperating therewith movably mounted in said housing between said cones for adjustment toward and away from said cones, means for forcing said bearing cup members apart to take up lost motion in said bearing, said means including two rings screwed one within the other, one of which has an adjustable connection with said housing for positioning it lengthwise thereof to adjust said bearing and shaft longitudinally.

6. A bearing comprising a race-way and an externally threaded sleeve, said sleeve having a series of notches spaced around it, an internally threaded tubular support within which said sleeve is screwed, said support being split longitudinally on one side at its outer end, clamping means for contracting said tubular support around said sleeve, and a detent arranged in said split and held in position by said clamping means to engage in said notches in said sleeve.

7. In combination, two axially adjustable members comprising an inner member having screw threads upon its outer surface and an internally threaded tubular member within which said inner member is screwed, said tubular member having a longitudinal slot through one side, clamping means for contracting said tubular member around said inner member, and a detent arranged in said slot and held in place by said clamping means to engage and hold said members in adjusted position.

8. A bearing comprising a pair of oppositely disposed raceways mounted in a tubular support, an externally threaded sleeve screwed in said tubular support between said raceways, a second sleeve in said support having threaded engagement with said first sleeve, said sleeves each having a series of notches spaced around them, said support being split longitudinally on one side at its outer end, clamping means for contracting said tubular support around said sleeves, and a detent arranged in said split and held in position by said clamping means to engage in said notches in said sleeves.

9. A locking key adapted to be arranged in a slot of variable width, said locking key having an elastic pad upon its side.

10. A locking key adapted to be arranged in a slot of variable width, said locking key having a compressible pad upon its side.

11. A locking key adapted to be arranged in a slot of variable width, said locking key having a soft rubber pad vulcanized upon its side.

12. A split sleeve inclosing an adjustable member, in combination with a locking key for said member arranged in the split, a clamping bolt for clamping said split sleeve upon said adjustable member, said clamping bolt retaining said key in place, an opening in said sleeve for access to said adjustable member, and a cover for said opening retained by said key.

13. A split sleeve inclosing an adjustable member, in combination with a locking key for said member arranged in the split, a clamping bolt for clamping said split sleeve upon said adjustable member, said clamping bolt retaining said key in place, an opening in said sleeve for access to said adjustable member, and a cover for said opening comprising a piece of flexible metal and a compressible pad, said cover being arranged through a slot in said key whereby it is held in place thereby.

Signed at Detroit, Mich., this 6th day of December, 1915.

HERBERT W. ALDEN.